(12) United States Patent
Girondi

(10) Patent No.: US 11,845,026 B2
(45) Date of Patent: Dec. 19, 2023

(54) FILTER CARTRIDGE WITH ENGAGEMENT MEMBERS

(71) Applicant: UFI FILTERS S.P.A., Mantova (IT)

(72) Inventor: Giorgio Girondi, Mantova (IT)

(73) Assignee: UFI FILTERS S.P.A, Mantova (IT)

(*) Notice: Subject to any disclaimer, the term of this patent is extended or adjusted under 35 U.S.C. 154(b) by 371 days.

(21) Appl. No.: 17/262,626

(22) PCT Filed: Jul. 17, 2019

(86) PCT No.: PCT/IB2019/056110
§ 371 (c)(1),
(2) Date: Jan. 22, 2021

(87) PCT Pub. No.: WO2020/026059
PCT Pub. Date: Feb. 6, 2020

(65) Prior Publication Data
US 2022/0001314 A1    Jan. 6, 2022

(30) Foreign Application Priority Data

Jul. 31, 2018   (IT) ......................... 102018000007689

(51) Int. Cl.
*B01D 35/30* (2006.01)
*B01D 29/11* (2006.01)

(52) U.S. Cl.
CPC .............. *B01D 35/30* (2013.01); *B01D 29/11* (2013.01); *B01D 2201/291* (2013.01); *B01D 2201/305* (2013.01); *B01D 2201/4007* (2013.01)

(58) Field of Classification Search
CPC .. B01D 35/30; B01D 29/11; B01D 2201/291; B01D 2201/305; B01D 2201/4007; B01D 2201/303; B01D 29/15; B01D 35/005

(Continued)

(56) References Cited

U.S. PATENT DOCUMENTS

2007/0158263 A1* 7/2007 Brandt ................... B01D 29/96
  210/437

FOREIGN PATENT DOCUMENTS

DE    694 00 421 T2    4/1997
DE    102 48 907 A1    4/2004
(Continued)

OTHER PUBLICATIONS

International Search Report and Written Opinion of the International Searching Authority for International Patent Application No. PCT/IB2019/056110 dated Aug. 30, 2019, 8 pages.

(Continued)

*Primary Examiner* — Madeline Gonzalez
(74) *Attorney, Agent, or Firm* — Merchant & Gould P.C.

(57) ABSTRACT

A filter cartridge is for a vehicle fluid filter group that includes a filter body and cartridge engagement members in the filter cartridge and body engagement members in the filter body. The cartridge engagement members and body engagement members are configurable by mutual axial movement between an engagement configuration and a disengagement configuration. The cartridge filter includes an end plate with the cartridge engagement members arranged around the cartridge axis. The cartridge engagement members include two blocking groups, each blocking group including a blocking element. Each blocking element includes a stem and a tooth laterally projecting from the stem and defining an engagement undercut. In the blocking configuration, the tooth is in a housing region of the body engagement members, and an engagement projection is housed in the undercut. In axial movements, each stem yields elastically radially and/or laterally upon action of the engagement projection on the tooth.

19 Claims, 10 Drawing Sheets

(58) Field of Classification Search
USPC ....... 210/435, 441, 442, 444, 454, 451, 450, 210/455, 493.2
See application file for complete search history.

(56) References Cited

FOREIGN PATENT DOCUMENTS

DE  10 2010 016 497 A1  10/2011
JP  2014514149 A  6/2014
WO  2004/091750 A1  10/2004

OTHER PUBLICATIONS

Japanese Office Action received for JP Serial No. 2021-503741 dated Apr. 25, 2023, 14 pgs.

* cited by examiner

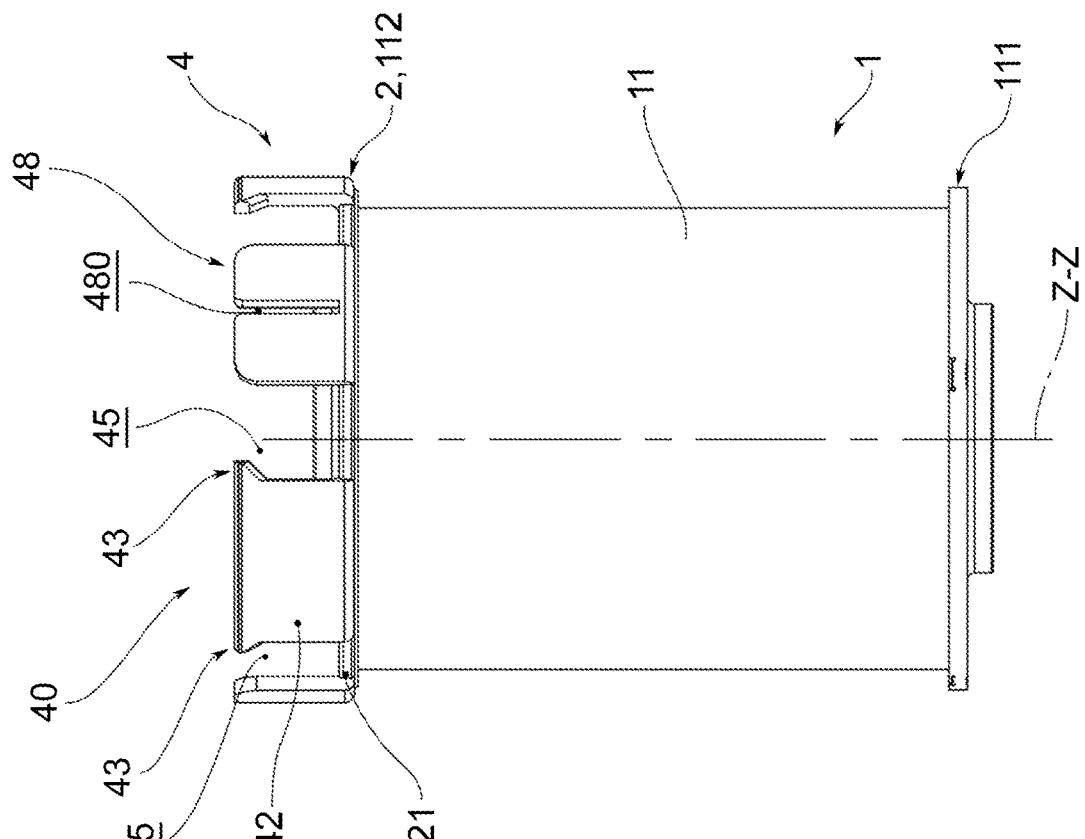
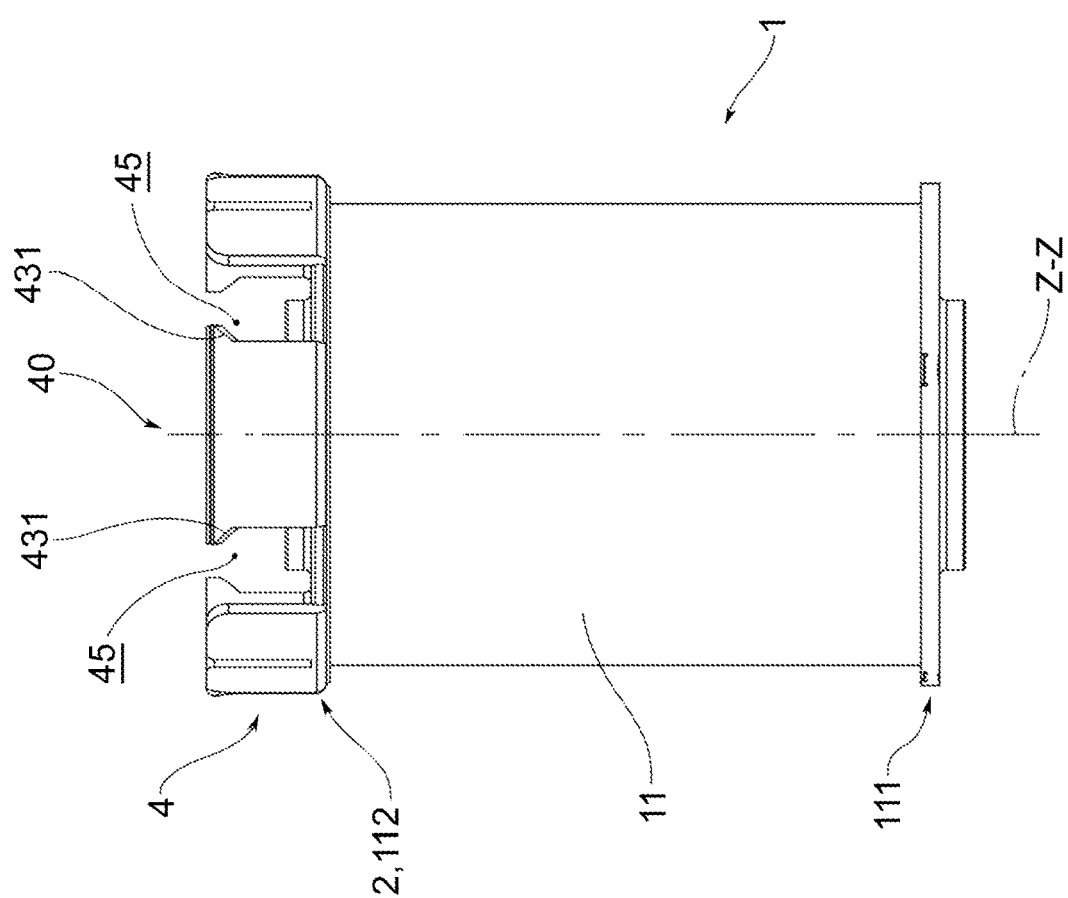

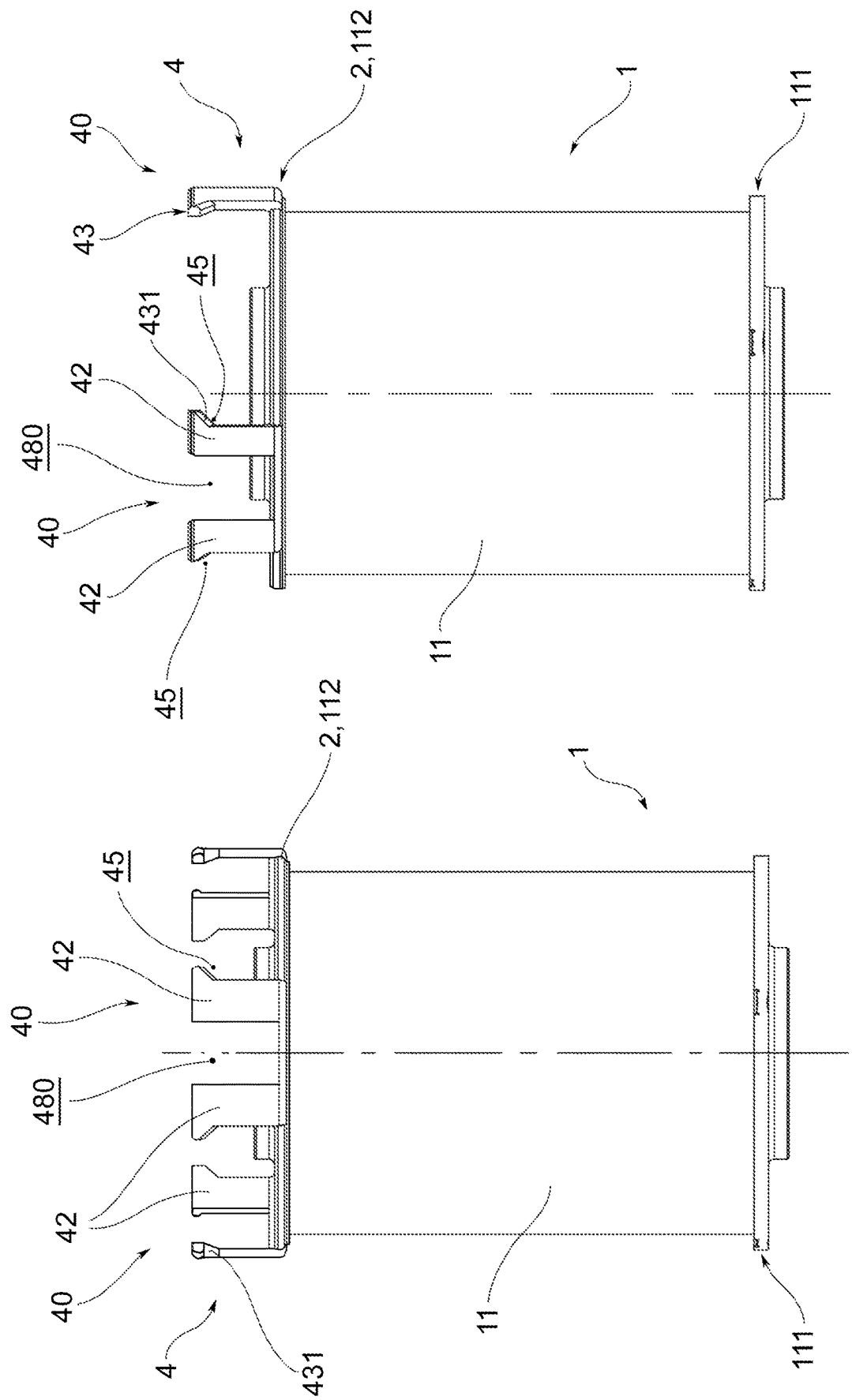

FILTER CARTRIDGE WITH ENGAGEMENT MEMBERS

This application is a National Stage Application of PCT/IB2019/056110, filed 17 Jul. 2019, which claims benefit of Patent Application Serial No. 102018000007689, filed 31 Jul. 2018 in Italy and which applications are incorporated herein by reference. To the extent appropriate, a claim of priority is made to each of the above-disclosed applications.

FIELD OF APPLICATION

The present invention relates to a filter cartridge of a filter group of a fluid. Moreover, the present invention also relates to a filter body comprised in said filter group of a fluid suitable for engaging said filter cartridge. In addition, the present invention also relates to the filter group of a fluid, comprising said filter cartridge and said filter body.

The present invention finds its preferred application in the automotive sector. Specifically, in fact, the context in which the present invention lies is that of filtration systems of a fluid with particular reference to fluids, liquids or gases needed for the operation of a motor vehicle. In other words, the filter group of a fluid and the components that comprise it as per the present invention find their application in the air circuits, oil circuits, fuel circuits and/or in the water (or aqueous solutions) in the ventilation circuits of blow-by gases comprised in a vehicle.

Systems for the filtration of a fluid in automotive applications are known in the prior art.

Such known filtration systems comprise one (or more) filter cartridges integrally connected to a filter body fluidically connected to the respective fluid circulation system. Depending on the specific application of the filter cartridge, the filter group and the filter body have different geometries and physical characteristics.

However, in any embodiment of the filter group comprising a filter cartridge, said filter cartridge needs to be replaceable according to the needs of the motor vehicle, for example to be replaceable in the case of necessary maintenance.

The main problem of the known filtration systems is therefore that of making the engagement and disengagement operations of the filter cartridge and filter body simple and intuitive. Along with this need, at the same time a blocking configuration is required in which the filter cartridge and filter body are reciprocally joined, this blocking being guaranteed over time not presenting the risk of unwanted detachments between said components.

In the prior art, solutions of filtration systems are known which provide for a mutual engagement between the filter cartridge and filter body requiring complex engagement and/or disengagement operations, in some cases also requiring additional, dedicated components, e.g. safety plugs.

Solution According to the Invention

The purpose of the present invention is therefore to provide a filter group of a fluid that ensures the safe blocking of the filter cartridge to its respective filter body, but which also allows simple and intuitive engagement and disengagement operations.

DESCRIPTION OF THE DRAWINGS

Further characteristics and advantages of the invention will, in any case, be evident from the description given below of its preferred embodiments, made by way of a non-limiting example with reference to the appended drawings, wherein.

DETAILED DESCRIPTION

Figure 1:
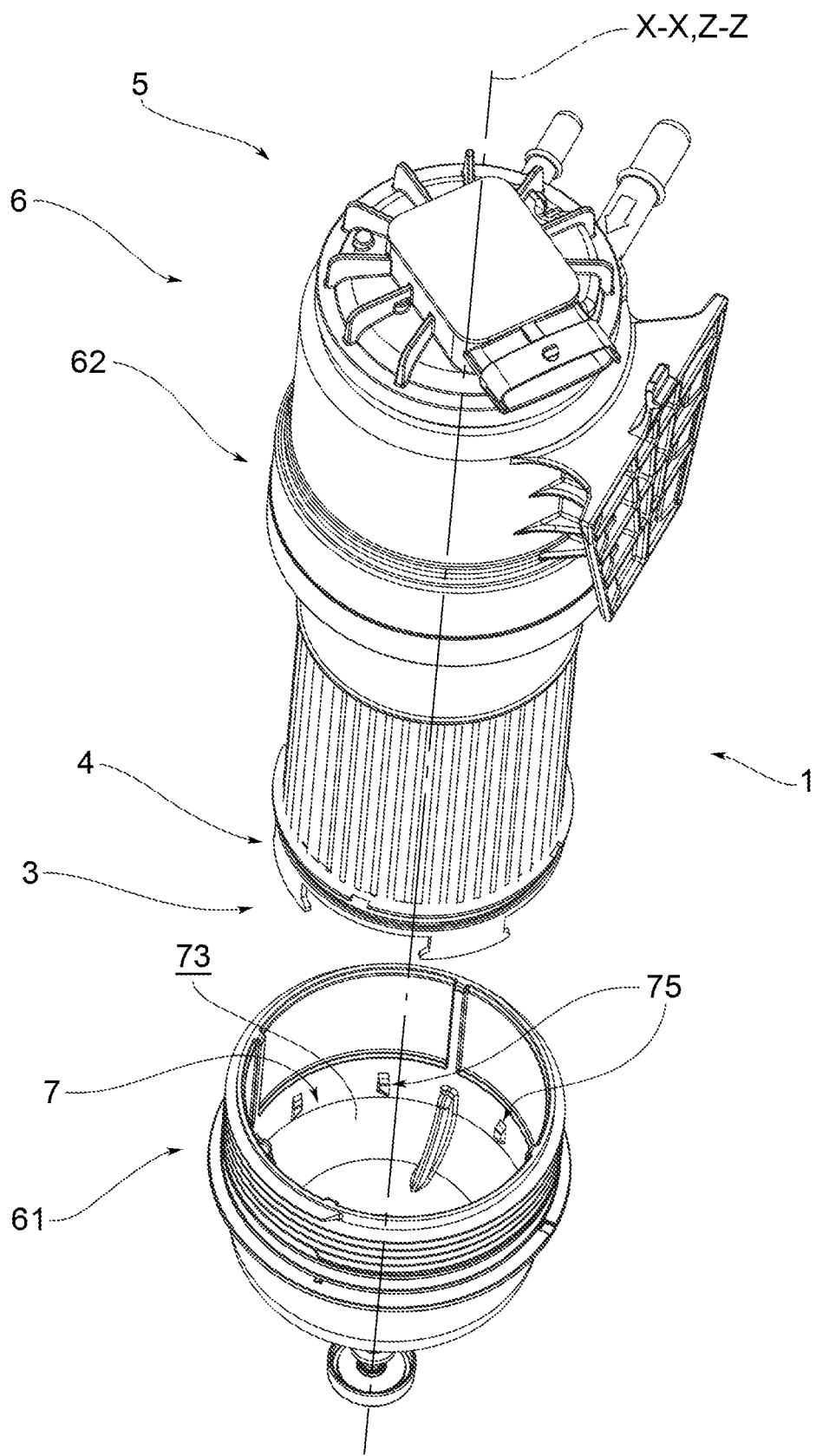
FIG. 1 shows a perspective view in separate parts of the filter group according to the present invention, according to a first preferred embodiment.

In the appended drawings, reference numeral 1 denotes a filter cartridge according to the present invention. According to the drawings and the present invention, reference numeral 5 denotes a filter group of a fluid in its entirety which comprises said filter cartridge 1. In addition, the filter body in turn comprised in the filter group 5 is globally denoted by reference numeral 6.

As shown by way of example in the appended drawings, the filter group of a fluid 5 extends in a main axial direction, in particular along a main axis X-X.

According to the present invention, the filter group of a fluid 5 comprises the filter cartridge 1 (hereinafter extensively described) and the filter body 6 (in turn, extensively described). Preferably, said two components are arranged along said main axis X-X.

According to the present invention, the filter group of a fluid 5 also includes special engagement means 3 suitable to allow the mutual engagement and disengagement of the filter cartridge 1 and the filter body 6 along said main axis X-X.

As amply described and visible in the appended drawings said engagement means 3 comprise elements specifically made on the filter cartridge 1 and elements specifically made on the on the filter body 6: in fact, the engagement means comprise cartridge engagement members 4 comprised in the cartridge filter 1 and body engagement members 7 comprised in the filter body 6.

As described below and shown in the appended drawings the cartridge engagement members 4 and the body engagement members 7 are respectively specifically shaped to mutually engage in an engagement configuration in which the filter body 6 and filter cartridge 1 are mutually integrally engaged to each other and a disengagement configuration in which the filter body 6 and filter cartridge 1 are mutually disengaged from each other.

In particular, the cartridge engagement members 4 and the body engagement members 7 are respectively specifically shaped so as to be configurable in the aforesaid configurations by means of a mutual axial movement between the filter body 6 and filter cartridge 1.

Figure 2C:
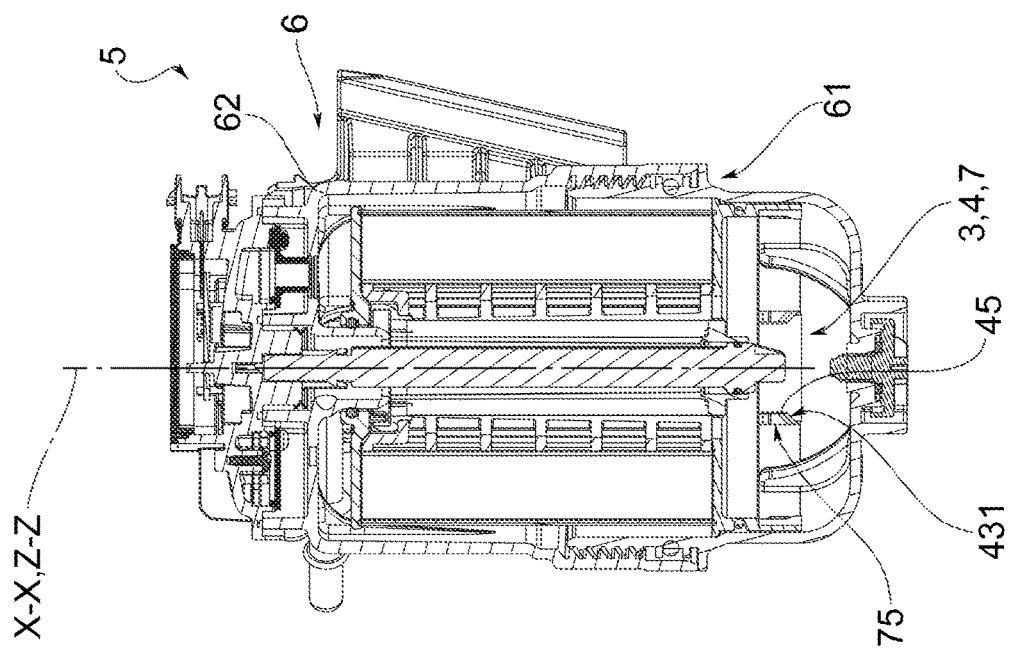
FIGS. 2a, 2b and 2c respectively show three cross-section views of the filter group as in FIG. 1, in several, separate engagement steps.
Figure 2B:
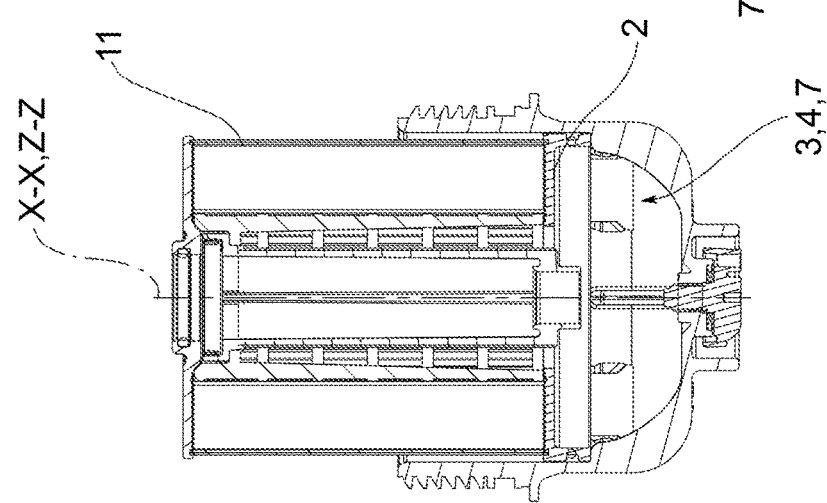
Figure 2A:
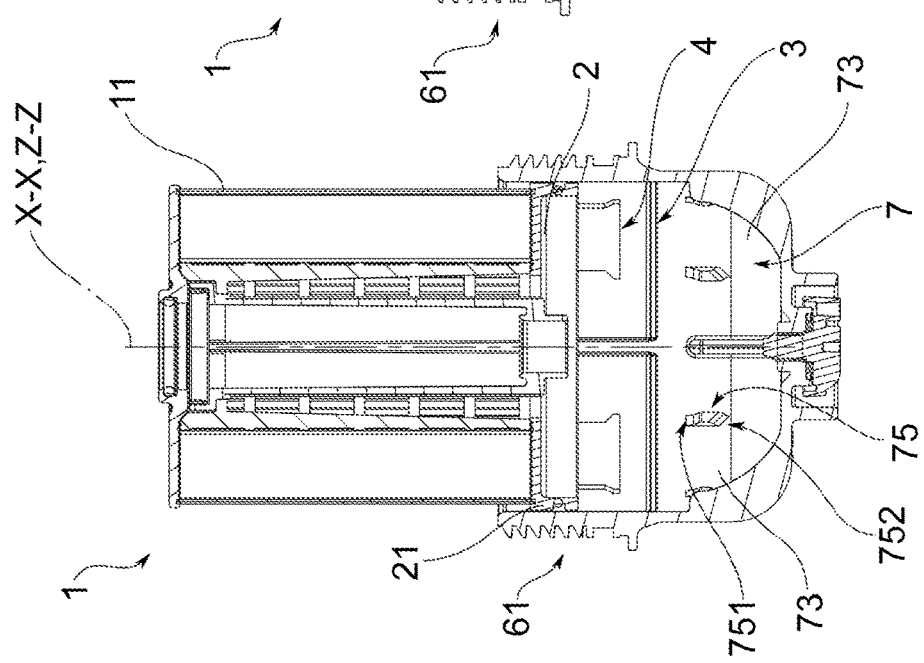
Figure 3:
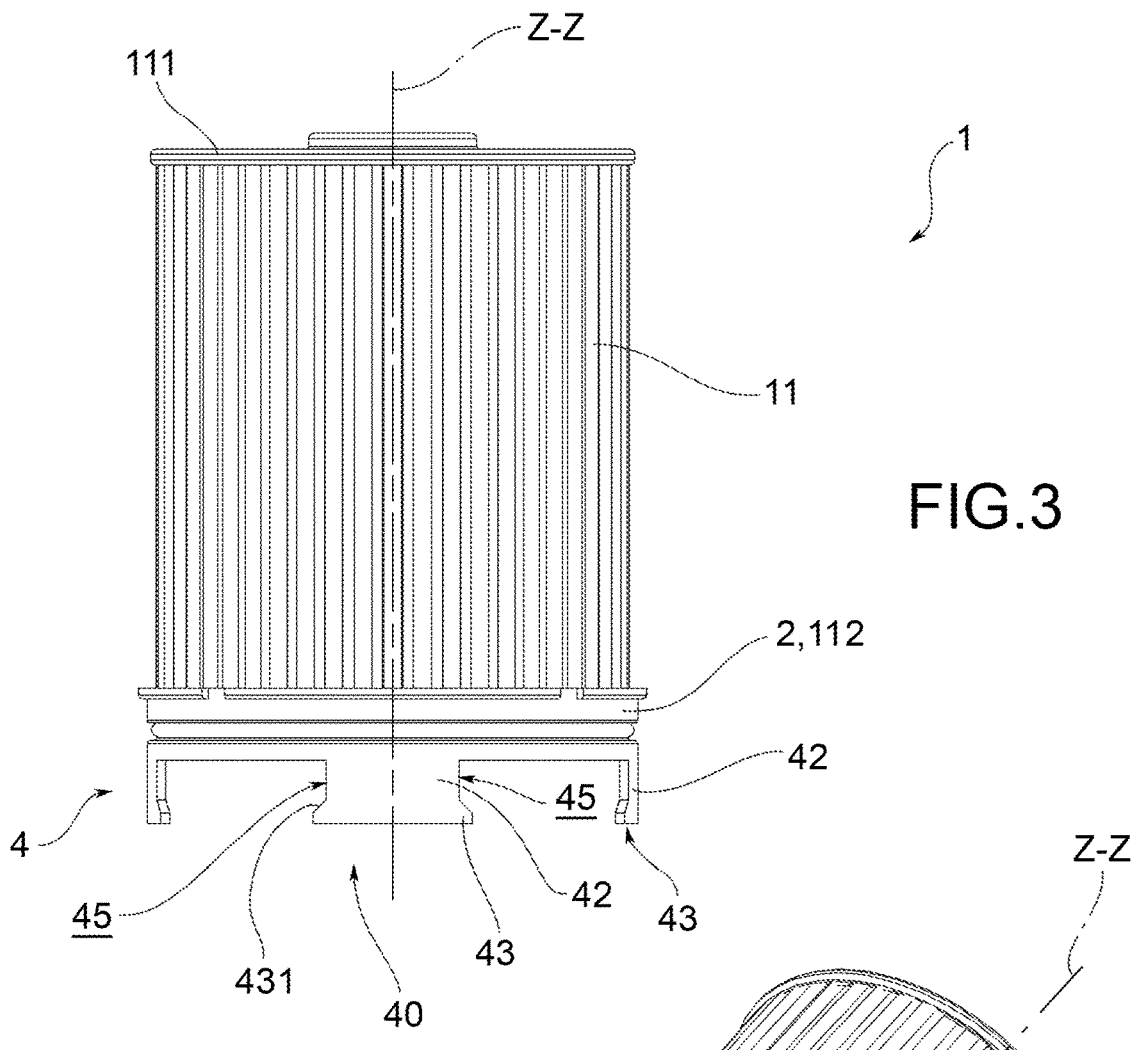
FIGS. 3 and 3a show two views, respectively lateral and in perspective, of the filter cartridge comprised in the filter group as in FIG. 1, according to the present invention.
Figure 3A:
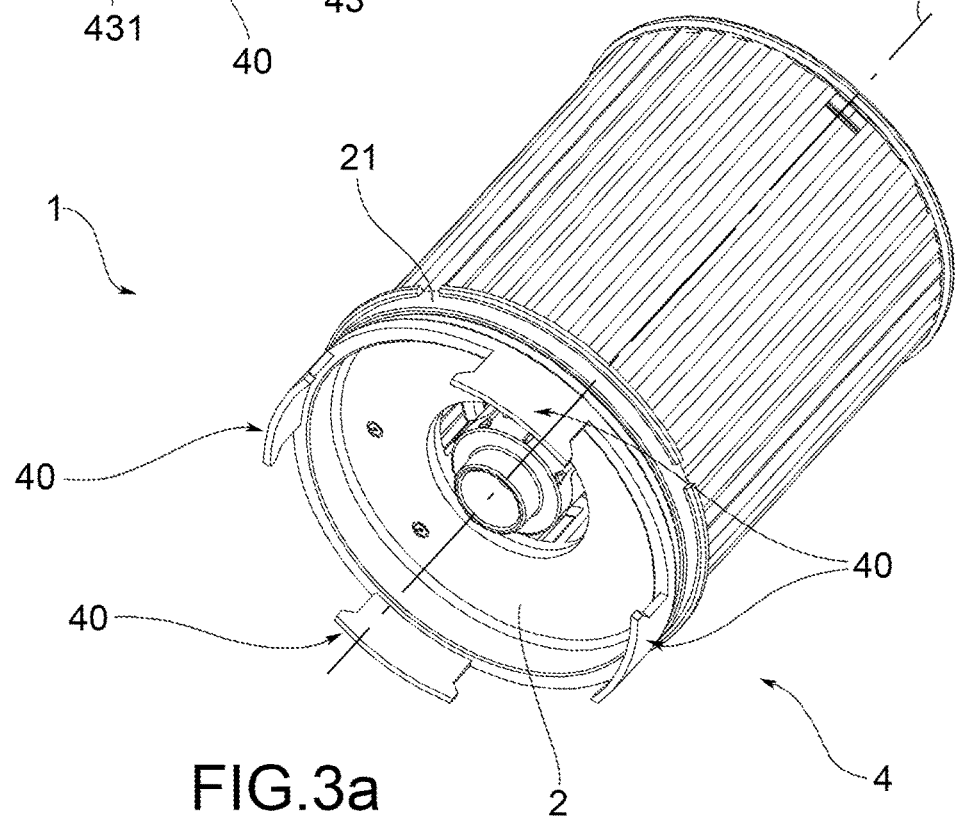
Figure 4:
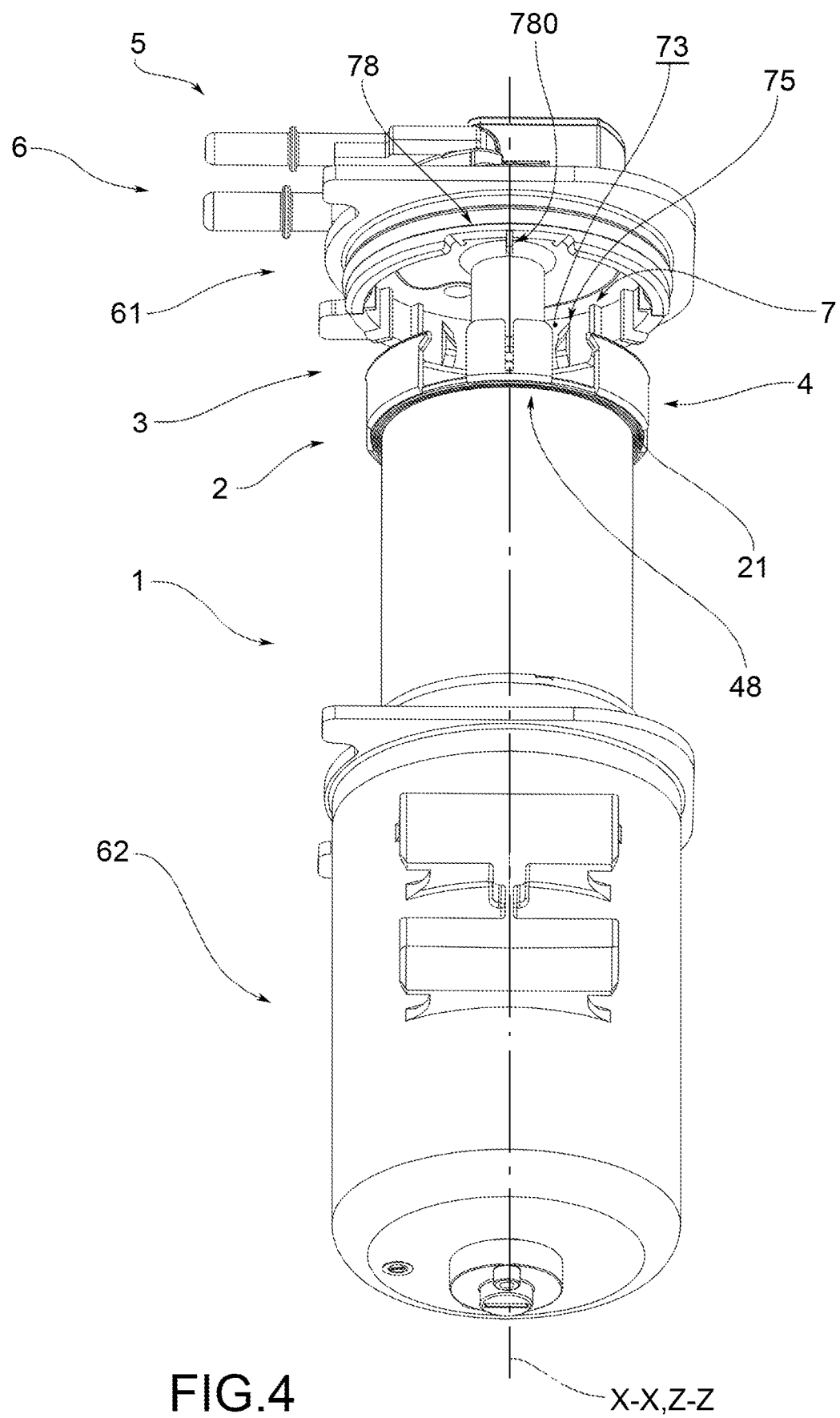
FIG. 4 shows a perspective view in separate parts of the filter group according to the present invention, according to a second preferred embodiment.
Figure 5A:
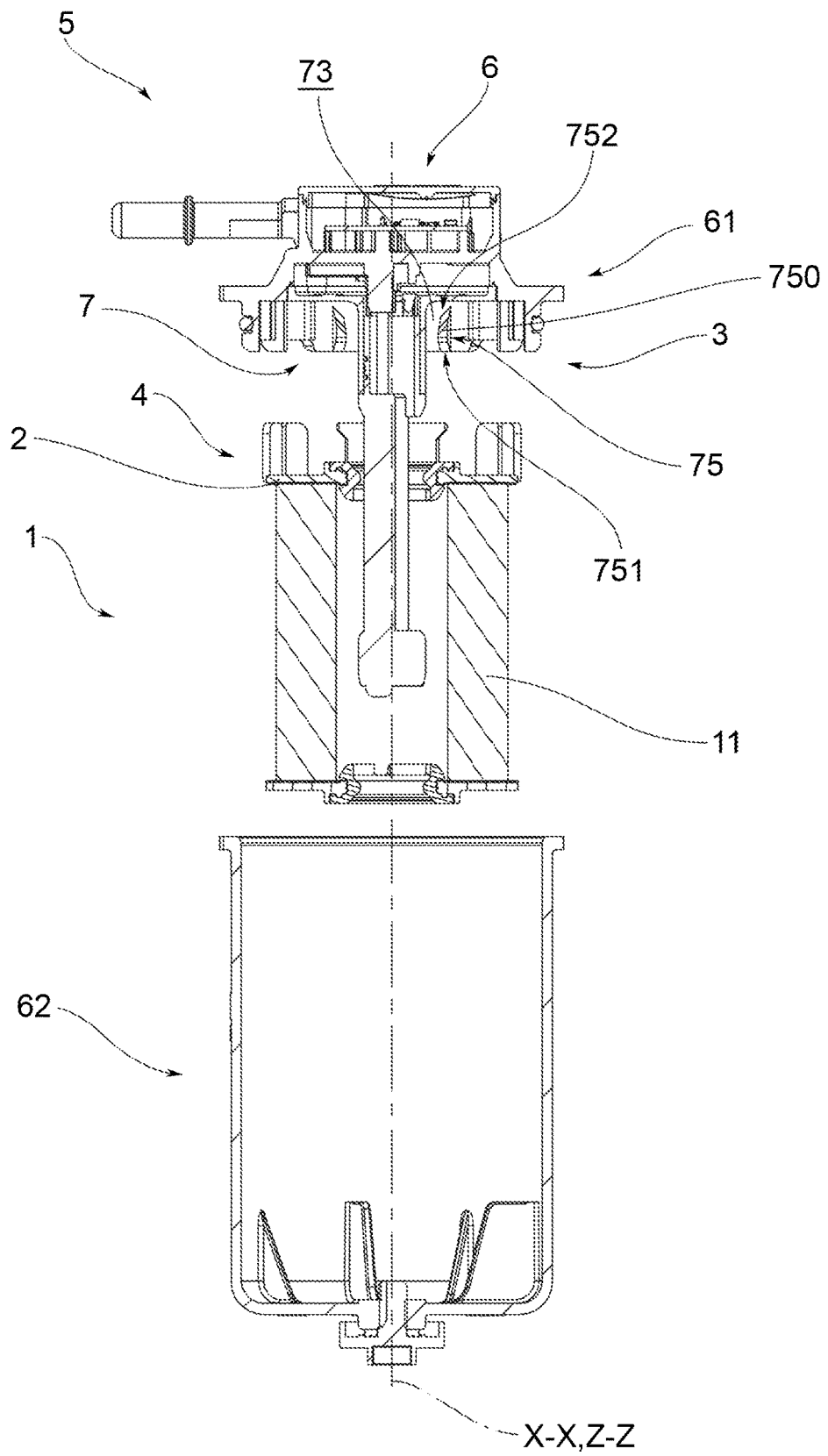
FIGS. 5a, 5b and 5c respectively show three cross-section views of the filter group as in FIG. 4, in several, separate engagement steps.
Figure 5C:
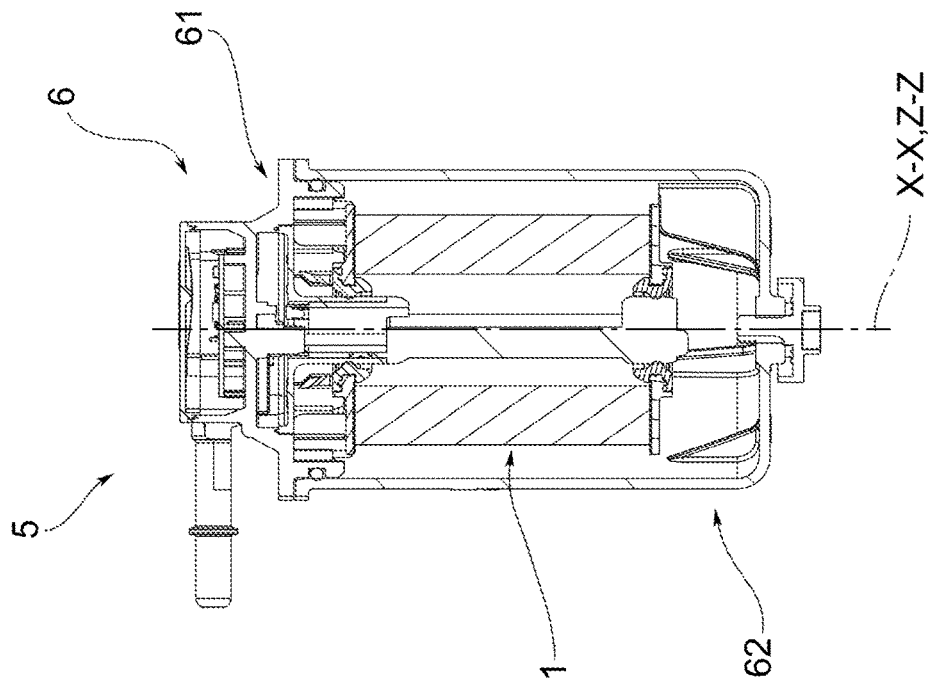
Figure 5B:
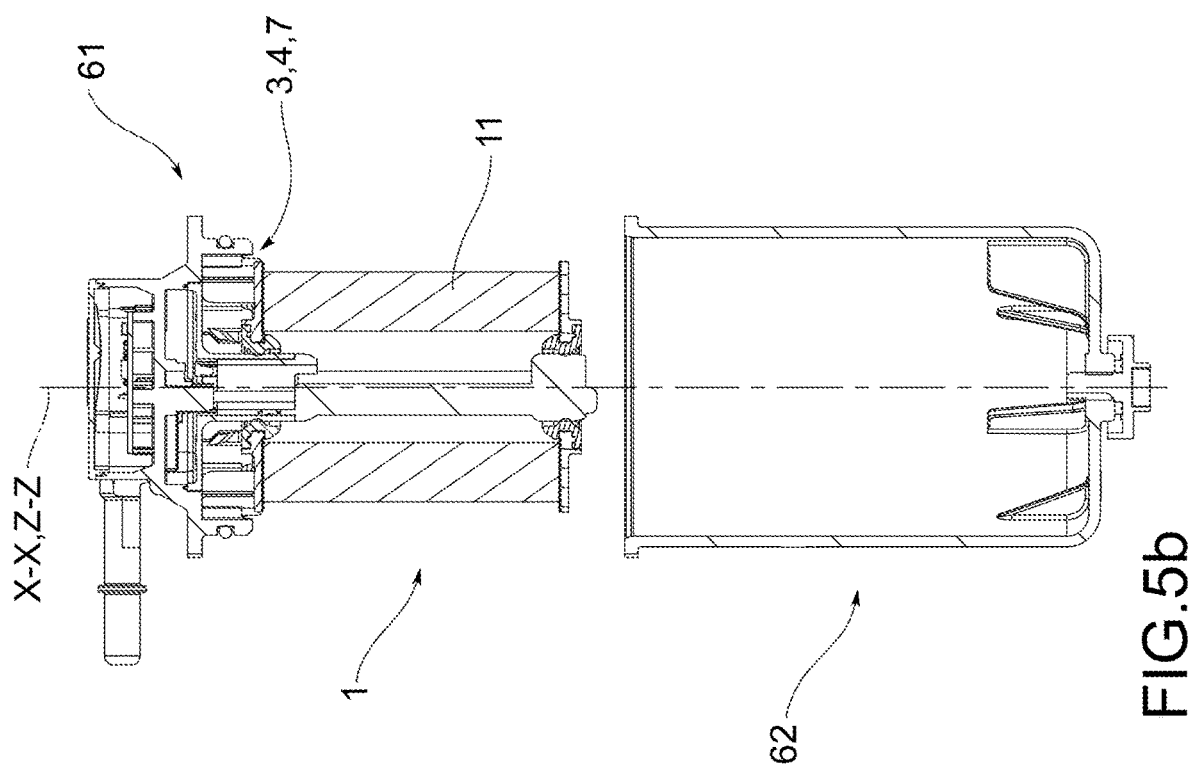
Figure 6A:
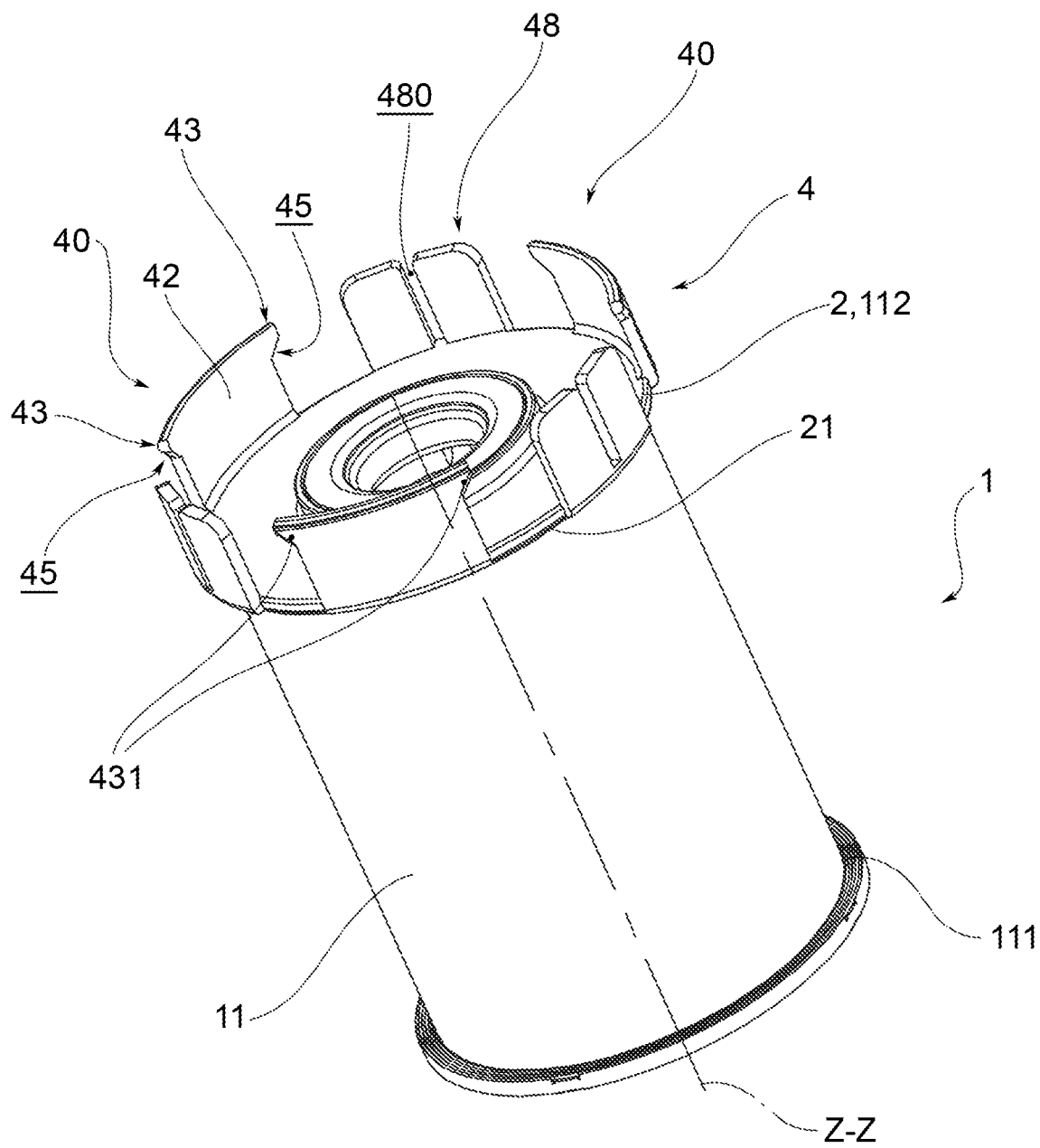
FIGS. 6', 6" and 6a show two views, respectively lateral and in perspective, of the filter cartridge comprised in the filter group as in FIG. 4, according to the present invention.
Figure 7A:
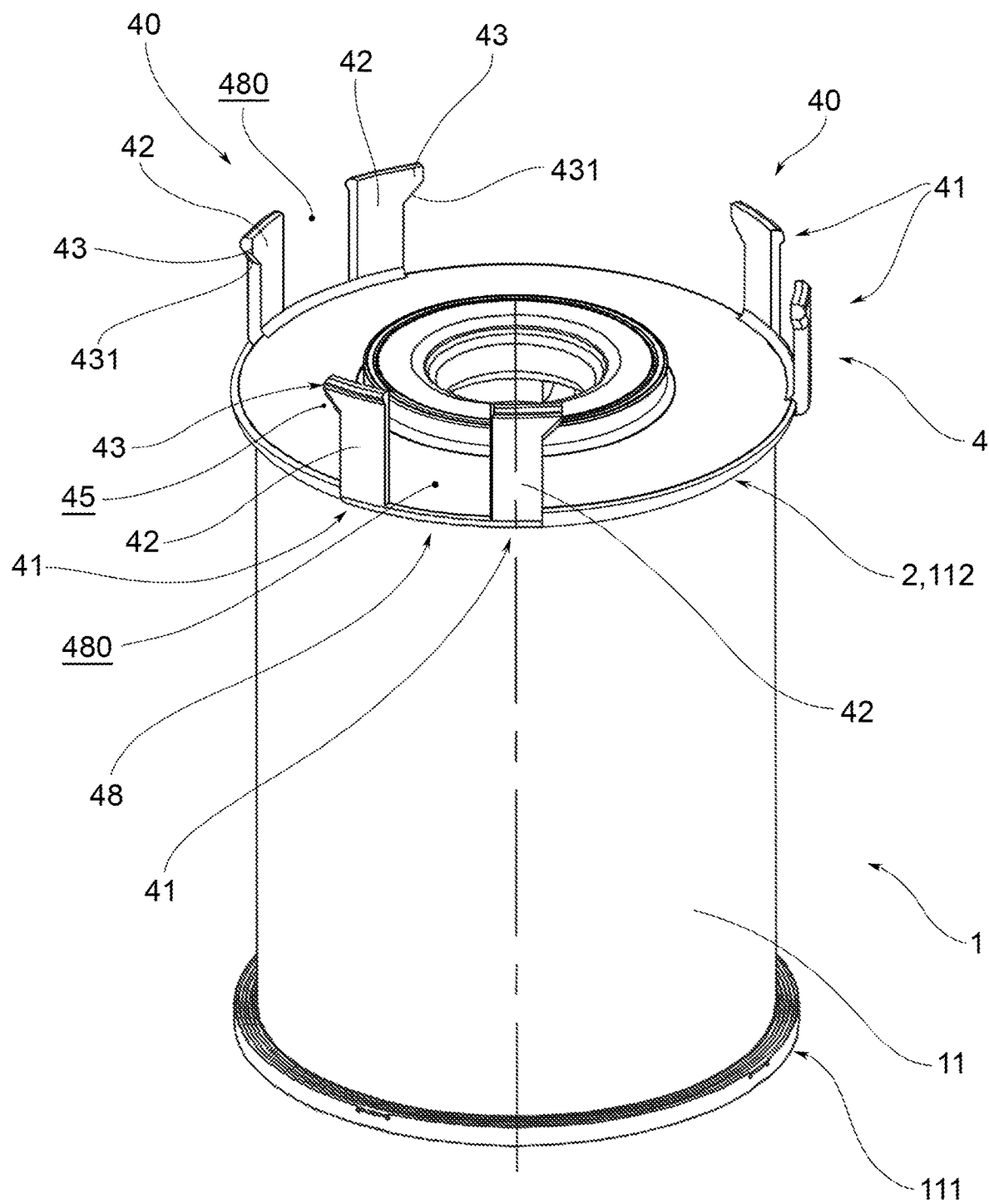
FIGS. 7', 7" and 7a respectively show two lateral views, and a perspective view of a filter cartridge according to the present invention, according to a further preferred embodiment.

In other words, the reciprocal engagement between the filter cartridge 1 and filter body 6 takes place in an axial direction along the main axis X-X. In other words, the filter body 6 and filter cartridge 1 are engageable and disengageable from each other according to the plug-socket principle (as shown by way of example in FIGS. 2a, 2b and 2c relative to a first embodiment and in FIGS. 5a, 5b and 5c relative to a second embodiment).

According to the present invention, the filter cartridge 1 extends along a cartridge axis Z-Z.

Preferably, in the blocking configuration the cartridge axis Z-Z coincides with the main axis X-X.

According to the present invention, in embodiments of filter groups of a fluid 5 comprising a plurality of filter cartridges 1, each filter cartridge 1 extends along a cartridge axis Z-Z oriented parallel to the axis X-X.

According to the present invention, moreover, the filter cartridge 1 comprises at an axial end thereof an end plate 2: on said end plate 2, said cartridge engagement members 4 are placed which extend in height parallel to the cartridge axis Z-Z; in particular, said cartridge engagement members 4 are placed around said cartridge axis Z-Z.

Preferably, the filter cartridge 1 comprises a filter medium 11 extending along the cartridge axis Z-Z and comprising a first filter plate 111 and a second filter plate 112 respectively placed at the axial ends of the filter medium 11. Preferably, the first filter plate 111 and second filter plate 112 are welded to the axial ends of the filter medium 11. Preferably, one out of the first filter plate 111 and the second filter plate 112 corresponds with said end plate 2 housing said cartridge engagement members 4.

According to a preferred embodiment, the filter medium 11 is hollow, cylindrical and traversable by the fluid radially. Preferably, the first filter plate 111 and/or the second filter plate 112 comprise special through apertures through which the fluid flows.

The present invention is not limited to specific geometries of the end plate 2 and the cartridge engagement members 4 except for the characteristics described below.

According to a preferred embodiment, the end plate 2 comprises, made in one piece, the cartridge engagement members 4, for example end plate 2 and cartridge engagement members 4 are co-moulded in a single body.

According to the present invention, the cartridge engagement members 4 comprise at least two blocking groups 40.

Each blocking group 40 comprises at least one blocking element 41 suitable to engage a specially-shaped portion of the body engagement members 7.

In more detail, each blocking element 41 comprises a stem 42 and at least one tooth 43.

Said stem 42 extends from the end plate 2.

Said tooth 43 is positioned at the axial end of the stem 42 distal from the end plate 2.

Said tooth 43 projects from the stem 42 defining therewith an engagement undercut 45.

The tooth 43 projects from the stem 42 in a lateral direction, that is in a circumferential or tangential direction with respect to the cartridge axis Z-Z.

According to the present invention, therefore, the tooth 43 and the stem 42 define an engagement undercut 45 in such a way that in the blocking configuration the tooth 43 is housed in a housing region 73 comprised in the specially-shaped body engagement members 7 and an engagement projection 75 comprised in the specially-shaped body engagement members 7 is housed in the undercut 45.

According to some preferred embodiment variants, the housing region 73 is specially shaped to house the entire blocking element 41. In other embodiment variants, the housing region 73 is specially shaped to house the entire blocking group 40.

According to the present invention, each tooth 43 extends towards the facing blocking group 40. According to the present invention, each tooth 43 extends towards the facing blocking group 40 in a circumferential direction, preferably following the outer profile of the end plate.

In a preferred embodiment, two adjacent blocking groups 40 present respective teeth 43 which extend laterally towards each other. In other words, angularly consecutive teeth 43 extend in opposite directions. In other words, angularly consecutive teeth 43 extend in opposite directions to define respective engagement undercuts 45 reciprocally facing along the outer profile of the end plate.

According to the present invention, in the axial movements between the filter cartridge 1 and body 6 which entail mutual engagement or disengagement, the stem 42 of each blocking element 40 yields elastically in the radial direction and/or lateral direction.

In particular, said elastic yielding is due to the action of the engagement projection 75 on the tooth 43. In other words, the stem 42 incurs an action in a radial direction and/or in a lateral direction (that is circumferential or tangential) which entails its relative elastic yielding and relative movement thereof.

Moreover, according to a preferred embodiment, each tooth 43 comprises an inclined edge 431 so as to have a tapered shape in a lateral direction.

According to a preferred embodiment, the inclined edge 431 faces onto the undercut 45. In other words, the undercut 45 in a distal position from the end plate 2 is wider than in a proximal position to the end plate 2.

Preferably therefore, the undercut is delimited underneath by the end plate 2 and above by the inclined edge 431 of the tooth 43.

According to a preferred embodiment, the inclined edge 431 is suitable to permit the sliding of the respective tooth 43 on the respective engagement projection 75. According to the present invention, the engagement projection 75 is in turn shaped in a complementary manner so as to be housed in the undercut 45 with a shaped coupling and therefore in turn present an inclined portion with the inclined edge 431.

According to a preferred embodiment, the cartridge engagement members 4 comprise cartridge centering elements 48 suitable to engage with body centering elements 78 made on the filter body 6 so as to guide the insertion in an axial direction of the cartridge 1 onto the body 6.

According to a preferred embodiment, said centering elements 48 comprise a cavity 480 which extends in an axial direction, in which a centering body 780 made on the filter body 6 slides, comprised in the body centering elements 78.

According to a preferred embodiment, the centering elements 48 are positioned between the blocking groups 40. For example, the number of centering elements 48 corresponds to the number of angular spaces defined between the blocking groups 40.

According to a preferred embodiment, each blocking group 40 comprises two blocking elements 41, in which the two teeth 43, each part of the respective blocking element 41, extend in opposite lateral directions. Preferably the teeth 43 of the respective blocking element 41 extend circumferentially in opposite directions.

According to a preferred embodiment, the two blocking elements 41 of each blocking group 40 are integrally joined to each other in an axial direction along the respective stems 42. In other words, the blocking group 40 is substantially T or mushroom-shaped.

According to one embodiment variant, instead, the two blocking elements 41 in each blocking group 40 are angularly reciprocally distanced from each other. In other words, the blocking group 40 has the shape substantially of two inverted "Ls" presenting the respective stems 42 which extend parallel to each other.

According to a preferred embodiment, in the space between two adjacent stems 42 the centering cavity 480 is identified.

According to a preferred embodiment, the cartridge engagement members 4 have a planar extension on an imaginary circumferential plane having its centre on the cartridge axis Z-Z.

In other words, the cartridge engagement members 4 lie on an imaginary plane which extends circumferentially, concentrically to the axis Z-Z. In other words, both the blocking groups 40 and the centering elements 48 extend in a planar manner.

According to the present invention, the cartridge engagement members 4 comprise three, four or a higher number of blocking groups 40. The cartridge engagement members 4 are placed so as to be angularly equi-spaced from each other.

According to a preferred embodiment, the cartridge engagement members 4 are arranged in a perimetral position of the end plate 2.

In other words, the cartridge engagement members 4 are in a distal position with respect to the cartridge axis Z-Z at a perimetral edge 21 of the end plate 2.

According to a preferred embodiment, in the centre of the end plate 2 there are no encumbrances so that it is possible to envisage possible housings of any components or the presence of fluidic apertures through which the fluid to be filtered or already filtered is free to flow, to house further components comprised in the filter body 6.

As said, the present invention also relates to a filter body 6 of a filter group of a fluid 5 of a vehicle, wherein said filter group 5 extends along a main axis X-X and further comprises a filter cartridge 1 according to the above description and comprising engagement means 3 according to the above description.

In other words, the filter body 6 is suitable to comprise the body engagement members 7 respectively specially shaped so as to be configurable by means of a mutual movement in an axial direction, between an engagement configuration in which the filter body 6 and filter cartridge 1 are mutually integrally engaged and a disengagement configuration in which the filter body 6 and filter cartridge 1 are mutually disengaged.

According to a preferred embodiment, the body engagement means 7 comprise, at each blocking group 40 belonging to the filter cartridge 1 a housing region 73 suitable to house, in an engagement configuration, a respective tooth 43.

According to one embodiment variant, the housing region 73 is specially shaped to house the entire blocking element 41.

According to a further embodiment variant, the housing region 73 is specially shaped to house the entire blocking group 40.

According to one embodiment variant, the housing region 73 is made on the inner surface of the filter body 6 to remain aligned with the outer perimeter of the end plate 2.

Preferably, the body engagement members 7 further comprise an engagement projection 75 projecting in a radial direction and specially shaped to be housed in the undercut 45 of the respective blocking group 40.

In other words, according to the present invention, the respective tooth 43 is suitable to engage in an axial direction the engagement projection 75 preventing unwanted axial movements between the filter cartridge 1 and filter body 6.

Said engagement projection 75 is suitable to carry out an action on the respective tooth 43 to elastically move the stem 42 of the respective blocking element 40 in the radial direction and/or lateral direction.

In other words, to perform the engagement and the disengagement between the filter cartridge 1 and filter body 6, the tooth 43 is forced to go past or climb over the engagement projection 75. This is made possible thanks to the fact that the stem 42 is suitable to elastically flex in a radial direction (towards the X-X axis, or with respect to the cartridge axis Z-Z) and/or in a lateral direction, (in a circumferential or tangential direction with respect to the axis X-X, or with respect to the cartridge axis Z-Z).

According to a preferred embodiment, in fact the respective tooth 43 is suitable to slide on the engagement projection 75. Preferably, the engagement projection 75 comprises a first inclined portion 751 and a second inclined portion 752 respectively inclined with respect to the axis X-X with two opposite angles of inclination.

Preferably, the first inclined portion 751 and second inclined portion 752 are positioned axially consecutively to each other.

Preferably, the first inclined portion 751 and second inclined portion 752 are arranged so that the first inclined portion 751 exerts a thrust action on the respective blocking element 41 in the engagement operations, and the second inclined portion 752 exerts a thrust action on the respective blocking element 41 in the disengagement operations.

According to a longitudinal cross-section, the first inclined portion 751 and the second inclined portion 752 are respectively inclined with respect to the axis X-X.

To facilitate the sliding of the tooth 43 on the respective engagement projection, the first inclined portion 751 and/or the second inclined portion 752 also have an inclination with respect to the tangent to the circumference of the end plate 2, if seen according to a transverse cross-section with respect to the axis X-X.

According to a preferred embodiment, the first inclined portion 751 and the second inclined portion 752 are axially separate from a planar portion 750 having a constant radial thickness.

According to a preferred embodiment, the engagement projection 75 comprises a stopping block which separates the filter body 6 wall from which the engagement projection 75 extends, from the second inclined portion 752. In other words, the second inclined portion 752 has a surface on which the tooth 43 slides which is spaced in a radial direction from the wall of the filter body 6 by the presence of said stopping block.

In other words, to obtain the disengagement between the filter cartridge 1 and filter body 6, the axial pull action between the two components must entail moving past said block and the sliding of the inclined edge 431 on the engagement projection 75.

In yet other words, the stopping block has the purpose of obstructing the undisturbed sliding of the tooth 43 on the second inclined portion 752 which in a first moment must be forced to pass over said stopping block.

According to a preferred embodiment, the filter body 6 comprises a filtration chamber 60 in which the filter cartridge 1 is housable, wherein said body engagement members 7 are made on the inner walls of the filtration chamber 60.

Preferably, the filter body 6 comprises two half-shell elements 61, 62 suitable to define a filtration chamber 60, wherein the cartridge group 1 is engaged to one of two half-shell elements 61.

Preferably, the two half-shell elements 61, 62 are mutually engageable to each other by means of a rotatory movement, for example by screwing.

Preferably, the two half-shell elements 61, 62 are mutually engageable once the cartridge group 1 has been engaged to the half-shell 61 on which the body engagement elements 7 are made.

According to the present invention, the axial thrust action needed to achieve the engagement between filter cartridge 1 and filter body 6, that is the engagement force, and the axial pull action needed to achieve the disengagement between filter cartridge 1 and filter body 6, that is the disengagement force, are a function of the geometries and thicknesses of the blocking members 40 and of the engagement projections 75. Preferably, the disengagement force is different from the engagement force. In practice, the inclination of the first portion 751 has a different angle from the inclination of the second portion 752. Preferably, the disengagement force is greater than the engagement force. In practice, the inclination of the first portion 751 has a smaller angle than the inclination of the second portion 752.

The present invention also relates to a filter group of a fluid 5 of a vehicle comprising the filter body 6 described above, in which a cartridge group 1 such as that described above is housable. The filter group 5 comprises then engagement means 3 such as those described above suitable to allow the mutual engagement of the filter body 6 and cartridge group 1.

Innovatively, the filter cartridge, filter body, filter group of a fluid in a vehicle described above fully satisfies the purpose of the present invention overcoming the drawbacks typical of the prior art.

Advantageously, in fact, the assembly and disassembly operations of the filter cartridge-filter body are extremely simplified, intuitive and guided.

Advantageously, in the blocking configuration the means of engagement guarantee a fixed axial position of the two components maintained over time. Advantageously, the engagement between filter body and filter cartridge is ensured, and in particular the maintenance of mutual fluidic engagement between the two is guaranteed, preventing unintentional release in case of overpressure, vibrations or impact.

Advantageously, the axial blocking action performed by the edges provided on the lower sides of the lateral portions of the respective teeth is performed in an effective and reliable manner.

Advantageously, the axial blocking action thanks to the inclined edges is effectively unloaded onto the complementary components provided on the filter body, in an effective manner.

Advantageously, the geometry of the coupling system is simplified, simplifying the sizing of the teeth and their respective seats and advantageously minimising the complexity of the moulds used for the production of the means of engagement and the relative costs.

A further advantage of the present invention is therefore that it cannot be installed on filter bodies of filter cartridges not equipped with blocking groups such as those described. In other words, in the filter group, it is not possible to use conventional cartridges for example, to ensure, for example during maintenance operations, that the quality filter cartridges provided by the manufacturer are used.

Advantageously, the engagement means have reduced axial dimensions permitting maximisation of the filtering surface of the filter medium satisfying the requirements of the specific filter group.

Advantageously, the engagement means described are easy to implement on filter cartridges of different sizes and diameters.

Advantageously, the engagement means have reduced radial dimensions and are furnishable both on filter cartridges affected by a radial flow and by filter cartridges affected by an axial flow.

Advantageously, the engagement means on the filter body are configured as engagement brackets projecting in a radial direction from the inner surface of the body, this solution makes it possible to avoid recourse to particularly complex fastening seats simplifying the relative moulds and the machining procedures of the filter body.

It is clear that a person skilled in the art may make modifications to the filter cartridge, filter body, filter group of a fluid or assembly method so as to satisfy contingent requirements, all contained within the scope of protection as defined by the following claims.

LIST OF REFERENCE NUMBERS 1 filter cartridge
2 end plate
3 engagement means
4 cartridge engagement members
5 filter group of a fluid
6 filter body
7 body engagement members
11 filter medium
21 perimetral edge
40 blocking group
41 blocking element
42 stem
43 tooth
45 undercut
48 cartridge centering element
60 filtration chamber
61 first half-shell
62 second half-shell
73 housing region
75 engagement projection
78 body centering elements
111 first filter plate
112 second filter plate
431 inclined edge
480 cavity
750 planar portion
751 first inclined portion
752 second inclined portion
780 centering body
X-X main axis
Z-Z cartridge axis

The invention claimed is:

1. A filter cartridge of a fluid filter group of a vehicle, wherein said filter group extends along a main axis and comprises:
   i) a filter body engageable and fluidically connectable to the filter cartridge;
   ii) cartridge engagement members comprised in the filter cartridge and body engagement members comprised in the filter body, respectively shaped to be configurable by mutual movement in an axial direction, between an engagement configuration in which the filter body and the filter cartridge are mutually integrally engaged and a disengagement configuration in which the filter body and filter cartridge are mutually disengaged;

wherein the filter cartridge extends along a cartridge axis and comprises at an axial end an end plate on which said cartridge engagement members are arranged, which extend in height parallel to the cartridge axis and are arranged around said cartridge axis;

wherein said cartridge engagement members comprise at least two locking groups, wherein each locking group comprises at least one locking element, wherein each locking element comprises a stem and a tooth placed at an axial end of the stem projecting therefrom in a lateral direction, and in a circumferential or tangential direction, defining with the stem an engagement undercut in such a way that in the locking configuration the tooth is housed in a housing region shaped body engagement members and an engagement projection in the shaped body engagement members is housed in the undercut;

wherein each tooth extends towards a facing locking group of the at least two locking groups;

wherein, in axial movements between the filter cartridge and body, the stem of each locking element yields elastically in the radial direction and/or in the lateral direction upon action of the engagement projection on the tooth.

2. The filter cartridge according to claim 1, wherein each tooth comprises an inclined edge to have a tapered shape in a lateral direction, wherein said inclined edge faces onto the undercut, wherein said inclined edge permits sliding of the respective tooth on the respective engagement projection.

3. The filter cartridge according to claim 1, wherein the cartridge engagement members comprise cartridge centering elements guiding insertion in an axial direction of the cartridge onto the body engaging body centering elements comprised in the body engagement members.

4. The filter cartridge according to claim 3, wherein said centering elements comprise a cavity which extends in an axial direction, in which a centering body comprised in the body centering elements slides.

5. The filter cartridge according to claim 3, wherein said centering elements are positioned between the locking groups.

6. The filter cartridge according to claim 1, wherein each locking group comprises two locking elements, in which the two teeth extend in two opposite lateral directions.

7. The filter cartridge according to claim 6, wherein the two locking elements of each locking group are integrally joined to each other in an axial direction along the respective stems.

8. The filter cartridge according to claim 6, wherein the two locking elements comprised in each locking group are angularly reciprocally distanced from each other.

9. The filter cartridge according to claim 1, wherein the cartridge engagement members have a planar extension on an imaginary circumferential plane having a center on the cartridge axis.

10. The filter cartridge according to claim 1, wherein the cartridge engagement members comprise three or four locking groups.

11. The filter cartridge according to claim 1, wherein the cartridge engagement members are positioned in a perimetral position of the end plate, that is in a distal position with respect to the cartridge axis at a perimetral edge of the end plate.

12. The filter cartridge according to claim 1, comprising:
a filter medium traversable by fluid radially, extending along the cartridge axis;
a first filter plate and a second filter plate respectively at the axial ends of the filter medium;
wherein the first filter plate or the second filter plate correspond with the end plate.

13. The filter body of the fluid filter group of the vehicle according to claim 1, wherein said filter group extends along a main axis and further comprises:
i) the filter cartridge.

14. The filter body according to claim 13, wherein the body engagement members comprise, at each locking group of the filter cartridge a housing region to house, in an engagement configuration, a respective tooth, wherein the body engagement members further comprise an engagement projection projecting in a radial direction and shaped to be housed in the undercut of the respective locking group, wherein said engagement projection acts on the respective tooth to elastically move the stem of the respective locking element in the radial direction and/or lateral direction.

15. The filter body according to claim 14, wherein the engagement projection comprises a first inclined portion and a second inclined portion respectively inclined with respect to the axis with two opposite angles of inclination, axially consecutively arranged so that the first inclined portion exerts a thrust action on the respective locking element in the engagement operations, and the second inclined portion exerts a thrust action on the respective locking element in the disengagement operations.

16. The filter body according to claim 13, wherein said filter body comprises a filtration chamber in which the filter cartridge is housable, wherein said body engagement members are made on inner walls of the filtration chamber.

17. The filter body according to claim 16, comprising two half-shell elements defining a filtration chamber.

18. The fluid filter group of the vehicle according to claim 13, wherein said filter group extends along a main axis and comprises:
the filter cartridge;
the filter body.

19. The filter cartridge according to claim 12, wherein the filter medium comprises a hollow cylinder.

* * * * *